Nov. 22, 1932.  W. R. GRISWOLD  1,888,920
SHOCK ABSORBER
Filed Dec. 6, 1930
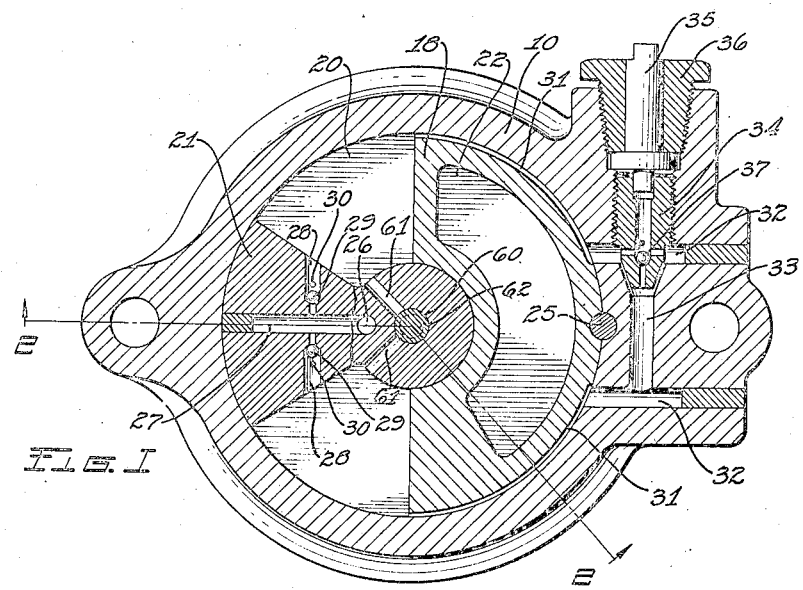
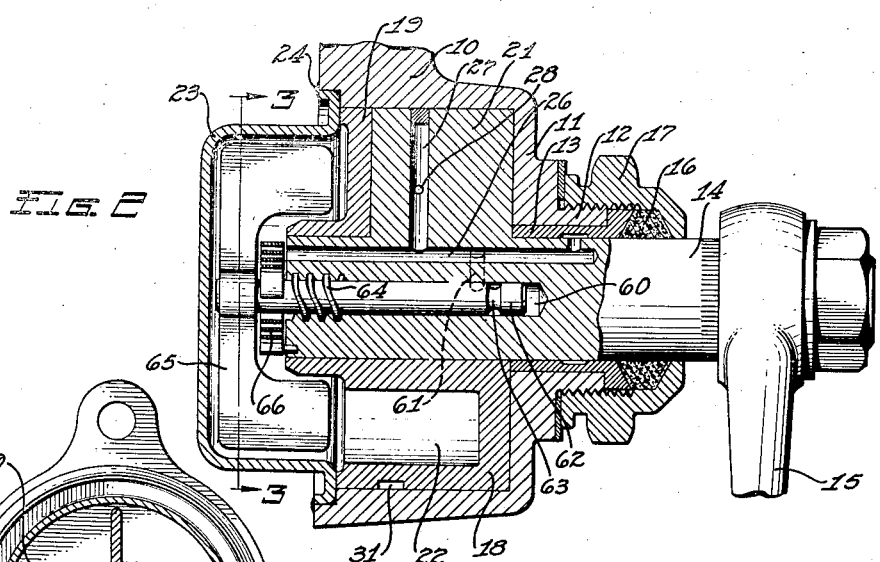
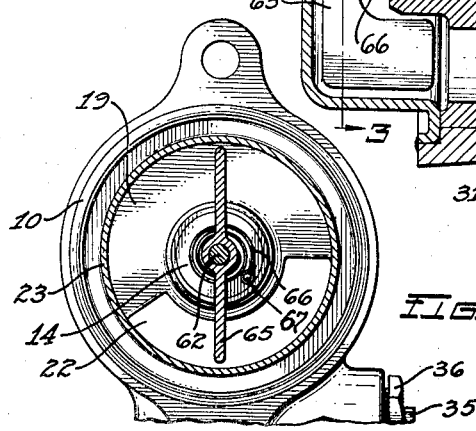
Inventor
WALTER R. GRISWOLD.
By
Attorney Patented Nov. 22, 1932

1,888,920

UNITED STATES PATENT OFFICE

WALTER R. GRISWOLD, OF DETROIT, MICHIGAN, ASSIGNOR TO PACKARD MOTOR CAR COMPANY, OF DETROIT, MICHIGAN, A CORPORATION OF MICHIGAN

SHOCK ABSORBER

Application filed December 6, 1930. Serial No. 500,585.

This invention relates to shock absorbers and more particularly to shock absorbers of the hydraulic type.

Hydraulic shock absorbers depend for their absorbing qualities upon the resistance set up in a chamber to the movement of a piston forcing fluid through restricted openings. The rate of fluid flow through an opening depends upon viscosity and it is evident that the resistance to piston movement is materially influenced by variations in viscosity thereby resulting in a varying action of the shock absorber in accordance with temperature.

In order to compensate for the varying viscosity of the fluid in the shock absorbers, it has been proposed to provide a manual adjustment for regulating the size of the relief openings but such adjustment must be made too often to meet temperature conditions in the usual climates if uniform riding qualities in a motor vehicle are to be maintained. It has also been proposed to supply the shock absorber with a prepared fluid which will operate over a long temperature range without an appreciable change in viscosity, but such fluids are expensive and are not satisfactory over a temperature range extending through fall and spring in average climatic conditions. Furthermore, with either of the above described systems, uniform riding qualities are not present because even in the coldest weather with the shock absorber in constant and violent action, the temperature of the fluid fluctuates sufficiently to materially vary the viscosity thereof.

The variation of the manual adjustment is often inconvenient and always an objectionable task so that it is ordinarily neglected, and an automobile is driven with shock absorbers having an action which is too hard or too soft. Such conditions are apt to result in broken springs or uncomfortable riding qualities.

An object of this invention resides in the provision of a shock absorber device of the hydraulic type in which the action is influenced by viscosity variations of the working fluid employed.

Another object of the invention is to provide a hydraulic shock absorber in which variation in the viscosity of the working fluid is compensated for automatically.

A further object of my invention is to provide a hydraulic shock absorber in which the viscosity of the working fluid influences a flow control valve to compensate for variations caused by temperature so that a uniform action results under all climatic conditions.

Other objects of the invention will appear from the following description taken in connection with the drawing, which form a part of this specification, and in which:

Fig. 1 is a sectional view of a shock absorber embodying the invention;

Fig. 2 is another sectional view taken on line 2—2 of Fig. 1;

Fig. 3 is a sectional view taken on line 3—3 of Fig. 2.

Referring to the drawing by characters of reference, 10 represents a casing structure for a hydraulic shock absorber which is adapted to be fixed to an element of a motor vehicle. This casing is provided with a transversely extending end wall 11 from which a hub portion 12 extends and a bearing 13 extends through and is carried by the end wall and the hub extension. Extending through the bearing is a shaft 14 upon which is fixed an arm 15, such arm being associated with an element of the motor vehicle movable relative to the element to which the casing 10 is fixed. A packing 16 surrounds the shaft at the outer end of the bearing and is held in position by the nut 17.

Another casing 18 is telescopically associated with the casing 10 and is provided with a recessed end wall 19 which encloses the casing 10 and forms therewith a chamber 20 in which a vane type of piston 21, formed as an integral part of the shaft 14, operates. The recessed portion of the casing 18 provides a chamber 22 which opens through the end wall 19, and a cover 23 encloses the end of the casing 18 and engages the end thereof to maintain the same axially in a fixed position. Such cover is welded, as indicated at 24, to the casing 10 and a key 25 is provided to prevent relative rotation of the two casing structures.

The recess 22 and the space between the cover 23 and the casing wall 19 provide a reservoir for the working fluid which can be returned to the working chamber 20 through the passage 26 formed to extend in an axial direction in the shaft and opening into the reservoir at its inner end. Connecting with the passage 26 is another passage 27 which extends perpendicularly thereto through the piston or vane 21 and ports 28 connect the passage 27 with the working chamber on opposite sides of the piston. One-way valves 29 are interposed in each of the passages 28 and stop members 30 are arranged therein to limit the movement of such valves.

A pair of grooves 31 extend around the peripheral wall of the casing 18 and lead from the ends of the working chamber 20 to the parallel passages 32 in the casing 10, such passages being connected by the passage 33 to provide for the movement of the working fluid from one side of the working chamber to the other under pressure of the piston or vane 21 in its movement.

A sleeve valve member 34 is screwed into the casing 10 so that one end thereof lies adjacent an end of the passage 33, and the space defined thereby determines the rate of travel of the working fluid between the grooves 31. A key member 35 is associated with the end of the sleeve valve 34 to regulate its position relative to its seat and a nut 36 is provided to retain the key member in desired adjusted position. Interiorly of the sleeve member 34 is a one-way valve 37 which permits additional flow of working fluid between the grooves 31 through valve ports and this auxiliary passageway through the valve member is independent of the control of the flow between the valve member and its seat.

Movement of the vane 21, through turning of the shaft 14, will compress the working fluid in one side of the working chamber and force the working fluid through the groove 31 on such side and through the passages 32 and 33, and through the other grooves 31 to the opposite side of the working chamber. In this manner the working fluid is moved back and forth from one side of the piston to the other through the grooves 31 and the passages 32 and 33. The flow is restricted by the valve 34, and in this manner the resistance to the vane movement can be increased or diminished so that a softer or harder ride will result. Working fluid is drawn from the reservoir, formed by the recess 22 and the cover 23, through the passages 26 and 27 and through the ports 28 into the working chamber, it being understood that the flow of fluid will move into the suction side of the chamber depending upon the vane movement and in this manner a uniform quantity of the working fluid is maintained in the operating circuit.

The shock absorber so far described forms the subject matter of applications Serial Nos. 293,125 and 366,975, filed July 16, 1928 and May 29, 1929 respectively, by Alfred Moorhouse, and is one type of shock absorber with which my invention, which I am about to describe, can be associated.

It will be seen that flow of the working fluid from one side of the piston to the other in the working chamber varies with temperature because of the resultant change of viscosity and the fixed position of the flow controlling valve. It is a purpose of this invention to automatically compensate for the change in the rate of fluid flow, caused by varying temperature, in a shock absorber through mechanism directly responsive to the viscosity of the working fluid.

To this end I provide the shaft 14 with an axially extending recess 60 having diverging passages 61 extending therefrom through the shaft on opposite sides of the vane 21 for shunting the working fluid in the chamber so that it will not be required to travel in its regular path. A valve 62 projects into the recess 60 for controlling the flow through the passages 61, and is formed with a circularly extending recess 63. The valve is also formed with a helical thread 64 which engages the shaft so that the valve can move axially relative to the shaft.

A vane 65 is arranged in the reservoir and is fixed to the end of the valve which projects therein, while a flat coiled spring 66 is fixed by the pin 67, to the shaft and is fixed to the projecting end of the valve. This spring forms a flexible driving connection between the valve and the shaft. The spring is of such a nature that it acts normally to screw the valve to its innermost position in the recess, and when in such position the recess 63 will be beyond the ports 61 so that the valve will prevent flow of the working fluid therethrough. When the viscosity of the working fluid, which is preferably a form of oil, is low the resistance thereof to movement of the vane 65 with the shaft 14 is not sufficient to overcome the spring tension and consequently the valve will rotate with the shaft and will thus prevent any flow of the working fluid through the ports 61. When the viscosity of the working fluid in the reservoir is caused to rise to a predetermined extent by temperature conditions, then greater resistance is offered to the rotation of the vane 65 with the shaft 14, and under such circumstances the vane will not move as fast as the shaft 14 which will cause the valve 62 to be screwed axially. This axial movement of the valve depends upon the viscosity of the working fluid and when the viscosity is high enough the recess 63 will be moved to a position where it will establish communication between the ports 61 and permit flow of the working fluid from one side of the vane 21 to the other in the working chamber, and in this manner the working fluid is shunted so that it is relieved from travel around the grooves 31 and the passages 32 and 33. The tension of the spring will determine the viscosity at which the valve is moved to a position where this shunting action will start, and the shunting can be arranged for so that regardless of the viscosity of the working fluid the resistance to the oscillation of the vane 21 will be substantially the same under all temperature conditions.

It will be seen that with the viscosity control described, a shock absorber can be provided which will have a uniform action under any temperature condition, and consequently no adjustment has to be made for different temperature conditions.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

What I claim is:

1. In a hydraulic shock absorber, a casing containing fluid, a piston in the casing, valve means controlling the flow of fluid from one to the other side of the piston during operation thereof, and means responsive to the viscosity of the fluid for regulating the valve means.

2. In a hydraulic shock absorber, a casing having a chamber containing fluid, a piston in the casing chamber, duct means through which fluid travels from one side of the chamber to the other under pressure caused by the piston movement, said piston having a passage through which fluid passes from one side of the piston to the other in the chamber, a valve for regulating the fluid flow through the passage in the piston and means actuated by the fluid in accordance with the viscosity thereof for regulating the valve.

3. In a hydraulic shock absorber, a casing having a fluid containing chamber, a movable piston in the casing chamber, duct means in the casing through which fluid is forced from one side of the chamber to the other, another duct means through which fluid can travel from one side of the chamber to the other, valve means in the last mentioned duct means, and means responsive to the viscosity of the fluid for automatically regulating the valve to maintain a uniform piston action under all temperature conditions.

4. In a hydraulic shock absorber, a casing having a fluid containing working chamber, a piston in the chamber, fluid in the chamber movable from one position to another by the piston, means regulating the rate of fluid movement, and means actuated by the fluid in accordance with the viscosity thereof for controlling said fluid regulating means.

5. In a hydraulic shock absorber, a casing having a fluid containing working chamber, a vane in the chamber having a duct through which fluid can be moved, a valve in the duct, and valve regulating mechanism responsive to the viscosity of the fluid in the casing.

6. In a hydraulic shock absorber, a casing containing a working chamber and a communicating reservoir, fluid in the chamber and reservoir, means including a valve for controlling the flow of fluid from one side of the piston to the other, and automatic mechanism partly in the reservoir for regulating the valve, said mechanism being responsive to the viscosity of the fluid in the reservoir.

7. In a hydraulic shock absorber, a casing containing a working chamber and a reservoir, a piston in the chamber, means including a valve for controlling fluid flow from one side of the chamber to another in response to the piston action, a vane in the reservoir for regulating the valve position, and a resilient connection between the valve and the piston.

8. In a hydraulic shock absorber, a casing containing a working chamber and a reservoir, fluid in the chamber and reservoir, a piston in the chamber having a shaft projecting into the reservoir. said piston shaft having a passage terminating on opposite sides of the piston in the chamber, a valve for regulating fluid flow through the passage, a vane in the reservoir fixed to the valve, and a resilient connection between the valve and the piston shaft, said connection normally urging the valve into position closing the passage.

9. In a hydraulic shock absorber, a casing containing a working chamber and a reservoir, fluid in the chamber and the reservoir, an oscillating piston in the chamber having a shaft projecting into the reservoir, said shaft having a passage therethrough opening on opposite sides of the piston in the casing, a valve extending axially through one end of the shaft and helically threaded therein, said valve extending into the reservoir and movable axially to control fluid through the passage in the shaft, a vane in the reservoir fixed to the valve, and a spring connection between the shaft and the valve opposing relative rotation of the shaft and valve.

10. In a hydraulic shock absorber, a casing containing a working chamber, fluid in the chamber, a piston in the chamber, said casing having a passage connecting the chamber on opposite sides of the piston, means for relieving the fluid flow through the passage, and means actuated by the fluid in accordance with the viscosity thereof for adjusting said relieving means.

11. In a hydraulic shock absorber, a casing containing a working chamber, fluid in the chamber, a piston in the chamber, said casing having a passage connecting the chamber on opposite sides of the piston, means for permitting the shunting of fluid from one side of the chamber to the other to maintain a uniform piston action under varying degrees of the fluid viscosity, and means actuated by the fluid in accordance with the viscosity thereof for controlling said first named means.

12. In a hydraulic shock absorber having a chamber containing fluid, means for moving the fluid from one position in the chamber to another, means for regulating the rate of fluid movement, and means actuated by the fluid in accordance with the viscosity thereof for controlling said regulating means.

13. In a hydraulic shock absorber having a chamber containing fluid, means for moving the fluid from one position in the chamber to another, movable means for regulating the rate of movement, means actuated by the fluid in accordance with the viscosity thereof for actuating said fluid regulating means, and yieldable means resisting movement of said fluid regulating means.

14. In a hydraulic shock absorber, a casing having a fluid containing working chamber and a fluid reservoir, a piston in the chamber, means including a valve for controlling fluid flow from one side of the chamber to another in response to the piston action, a vane in the reservoir for regulating the valve position, and a yieldable connection between the valve and the piston.

In testimony whereof I affix my signature.

WALTER R. GRISWOLD.